United States Patent
Ye et al.

(10) Patent No.: US 11,593,952 B2
(45) Date of Patent: Feb. 28, 2023

(54) STRUCTURAL VIBRATION MONITORING METHOD BASED ON COMPUTER VISION AND MOTION COMPENSATION

(71) Applicant: Zhejiang University, Hangzhou (CN)

(72) Inventors: Xiaowei Ye, Hangzhou (CN); Zhexun Li, Hangzhou (CN); Tao Jin, Hangzhou (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 17/519,370

(22) Filed: Nov. 4, 2021

(65) Prior Publication Data

US 2022/0138970 A1 May 5, 2022

(30) Foreign Application Priority Data

Nov. 5, 2020 (CN) .......................... 202011222425.9

(51) Int. Cl.
| | |
|---|---|
| G06T 7/292 | (2017.01) |
| G06T 7/70 | (2017.01) |
| G01H 9/00 | (2006.01) |
| G01M 5/00 | (2006.01) |

(52) U.S. Cl.
CPC .............. G06T 7/292 (2017.01); G01H 9/00 (2013.01); G01M 5/0008 (2013.01); G01M 5/0066 (2013.01); G06T 7/70 (2017.01); G06T 2207/30232 (2013.01)

(58) Field of Classification Search
None
See application file for complete search history.

(56) References Cited

U.S. PATENT DOCUMENTS

| | | | |
|---|---|---|---|
| 10,127,678 B2* | 11/2018 | Pérez Acal | G06T 7/593 |
| 2012/0033851 A1* | 2/2012 | Chen | G06T 7/0002 382/100 |
| 2013/0216089 A1* | 8/2013 | Chen | G06T 7/0002 382/100 |
| 2019/0087658 A1* | 3/2019 | De Mers | G06V 20/176 |
| 2020/0175352 A1* | 6/2020 | Cha | G06N 3/04 |
| 2021/0006725 A1* | 1/2021 | Niezrecki | G01C 11/02 |

FOREIGN PATENT DOCUMENTS

CN 111076880 A * 4/2020 .......... G01M 5/0008

* cited by examiner

*Primary Examiner* — Delomia L Gilliard
(74) *Attorney, Agent, or Firm* — McDonnell Boehnen Hulbert & Berghoff, LLP

(57) ABSTRACT

A structural vibration monitoring method based on computer vision and motion compensation provided in the present disclosure adopts a dual-camera system for self-motion compensation. The dual-camera system consists of a primary camera and a secondary camera rigidly connected to each other. The primary camera directly measures a structure displacement. This method inevitably includes an error generated due to motion of the primary camera. Meanwhile, the secondary camera measures displacements of translation and rotation, so as to estimate a measurement error caused by the motion of the primary camera. Then, with the displacement directly measured by the main camera minus the measurement error, a corrected structure displacement is obtained, thereby truthfully and accurately monitoring vibrations of a bridge structure.

1 Claim, 2 Drawing Sheets

A: Installing cameras
A1: Selecting a bridge and marking monitored points on key cross sections
A2: Connecting and selecting a position to install the cameras
A3: Selecting two groups of reference points at different distances away from the secondary camera
A4: Debugging the cameras and obtaining monitoring images B: Adjusting the primary camera
B1: Marking the monitored points in the image and recording initial positions
B2: Measuring a distance between each monitored point and the primary camera
B3: Calculating a proportion coefficient of a pixel size to an actual size on the distances
B4: Marking possible displacement ranges of the monitored points C: Adjusting the secondary camera
C1: Marking reference points in the image and recording initial positions
C2: Measuring a distance between each reference point and the secondary camera
C3: Calculating a proportion coefficient of a pixel size to an actual size on the distances
C4: Marking possible displacement ranges of the reference points D: Calculating and recording vibration data
D1: Calculating displacements of the monitored points and reference points before motion compensation
D2: Establishing a displacement corresponding relation between the camera and the reference points
D3: Processing a displacement value of bridge structure after motion compensation
D4: Recording bridge vibration monitoring data

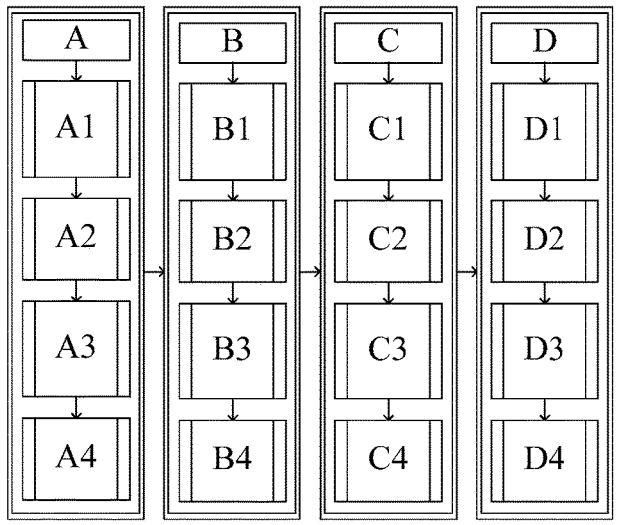

A: Installing cameras
A1: Selecting a bridge and marking monitored points on key cross sections
A2: Connecting and selecting a position to install the cameras
A3: Selecting two groups of reference points at different distances away from the secondary camera
A4: Debugging the cameras and obtaining monitoring images B: Adjusting the primary camera
B1: Marking the monitored points in the image and recording initial positions
B2: Measuring a distance between each monitored point and the primary camera
B3: Calculating a proportion coefficient of a pixel size to an actual size on the distances
B4: Marking possible displacement ranges of the monitored points C: Adjusting the secondary camera
C1: Marking reference points in the image and recording initial positions
C2: Measuring a distance between each reference point and the secondary camera
C3: Calculating a proportion coefficient of a pixel size to an actual size on the distances
C4: Marking possible displacement ranges of the reference points D: Calculating and recording vibration data
D1: Calculating displacements of the monitored points and reference points before motion compensation
D2: Establishing a displacement corresponding relation between the camera and the reference points
D3: Processing a displacement value of bridge structure after motion compensation
D4: Recording bridge vibration monitoring data

FIG. 2

STRUCTURAL VIBRATION MONITORING METHOD BASED ON COMPUTER VISION AND MOTION COMPENSATION

CROSS REFERENCE TO RELATED APPLICATION(S)

This patent application claims the benefit and priority of Chinese Patent Application No. 202011222425.9 filed on Nov. 5, 2020, the disclosure of which is incorporated by reference herein in its entirety as part of the present application.

TECHNICAL FIELD

The present disclosure relates to a structural vibration monitoring method based on computer vision and motion compensation.

BACKGROUND ART

Some bridge structures have relatively large potential safety hazards due to initial defects such as imperfect design theories, material limitations during building, and poor construction quality. The built bridges would experience long-term structural deformation and generate performance degradation since they are subjected to effects of various loads accumulated over a long period during operation, including dead weight, prestress, traffic, and stress re-distribution caused by damages and temperature change. In addition, in-service bridges may also experience influence of disastrous factors such as earthquakes and typhoon, thereby suffering structural destructions. Problems such as the initial defects, performance degradation, and structural destructions of the bridges cause continuous emerging of bridge collapse accidents, resulting in a large amount of economic losses and human casualties. Therefore, safe operation and health monitoring of the bridges get more and more attention.

A vibration state, as an important monitoring item in bridge monitoring, may reflect a structural health condition of the bridge. Hence, bridge vibration monitoring is widely applied to structural health monitoring and safety evaluation. The existing bridge structure vibration monitoring method mainly includes the following:

Acceleration sensors are embedded inside the bridge structure, and bridge vibrations excited when vehicles pass are collected during daily operation. This method can theoretically implement long-term monitoring of the structure. However, the sensors need to be installed in advance during building the bridge, which causes it difficult to maintain and replace faulted sensors.

Acceleration sensors are installed on a surface of the bridge, and the structure is excited by using a hammering method and a vibration exciting method, via an exciting device (a hammer and a vibration exciter), to measure a response of the structure during being excited. The method can directly measure the bridge vibration, and the measurement result is accurate and reliable. However, as the acceleration sensors are temporarily installed, and there exist problems, such as difficult installation of the sensors and low monitoring frequency, it is hard to perform timely vibration monitoring on a tremendous number of in-service bridges.

A method for recognizing bridge vibration via a moving vehicle is included. This method involves closing the road before a test to prevent interferences from other vehicles. In the test, a detection vehicle with the acceleration sensor installed passes through a target bridge, and the sensor thus records vibration data of the vehicle during passing on the surface of the bridge. Based on bridge structure information (e.g., structure type, bridge length, bridge width, and component materials), vehicle structure information (e.g., axle number, axle weight, wheelbase, and suspension stiffness of the vehicle), and vehicle vibration data, vibration of the bridge structure is calculated using the vehicle vibration data according to a coupling vibration relation between the vehicle and the bridge, and then a modal frequency of the bridge is obtained based on modal analysis. The method is more efficient than installing the acceleration sensors on the bridge for measurement, but it is hard to equip a large quantity of specified detection vehicles for their high price. Therefore, for a large number of in-service bridges, there still exists the problem of low monitoring frequency. In addition, road closure during detection will affect vehicle traffic, and thus it is difficult to implement in heavy traffic sections.

In recent years, the development of the computer vision technology enables a camera to be used as a vibration monitoring sensor. A computer-vision based civil engineering structural vibration monitoring method is gradually adopted owing to advantages of convenient installation, low system costs, and high measurement resolution. Most computer vision based methods relate to directly calculating structural vibrations in from structural motion videos. In these methods, it is assumed that the camera remains stationary throughout the monitoring process. However, it is impractical for the camera to remain completely stationary for a long period of time. Factors such as approaching of the moving vehicle and loosening of fixtures cause changes in position or angle of the camera, thereby rendering changes in the monitoring result. Hence, the computer vision monitoring method based on an assumption that the camera is completely fixed itself has an error during monitoring, thereby influencing the measurement precision.

SUMMARY

On the basis of the analysis above, the present disclosure provides a bridge-structural vibration monitoring method based on computer vision and motion compensation, to overcome disadvantages of the conventional methods, and accurately monitor the bridge-structural vibration.

The bridge-structural vibration monitoring method based on computer vision and motion compensation provided in the present disclosure adopts a dual-camera system for self-motion compensation. The dual-camera system consists of a primary camera and a secondary camera rigidly connected to each other. The primary camera directly measures a structure displacement. This method inevitably includes an error generated due to motion of the primary camera. Meanwhile, the secondary camera measures displacements of translation and rotation, so as to estimate a measurement error caused by the motion of the primary camera. Then, with the displacement directly measured by the primary camera minus the measurement error, a corrected structure displacement is obtained, thereby truthfully and accurately monitoring vibrations of a bridge structure.

A structural vibration monitoring method based on computer vision and motion compensation includes the following specific implementation steps:

A, installing cameras;

A1, selecting multiple monitored positions at key regions such as support points, a midspan, and anchor points for guying cables of a bridge to be monitored, and selecting positions with obvious contour features as monitored points;

A2, rigidly connecting a primary camera and a secondary camera, and selecting an installation position, such that the primary camera aims at a bridge to be monitored, and the secondary camera aims at a place where no displacement is assumed to occur, such as a nearby wall body or ground;

A3, selecting, on the wall body or ground in a monitoring range of the secondary camera, a plurality of positions with obvious contour features at a certain distance as a group of reference points; and selecting another distance in a range of depth of field and further selecting a plurality of positions as another group of reference points, to obtain a plurality of reference points with clear images and different distances; and A4, debugging the primary camera and the secondary camera, to ensure that real-time monitoring images of the bridge can be obtained, and capturing a first image frame;

B, adjusting the primary camera;

B1, selecting, from the first image frame captured in step A4, monitored points determined in step A1 as tracking targets of computer vision, where positions of the monitored points in the first image frame are initial positions of the monitored points;

B2, measuring a distance of a connection line between each monitored point and the primary camera;

B3, selecting two adjacent monitored points, and measuring a pixel distance on the image and an actual distance in the real world between the two monitored points, such that a computer automatically calculates a proportion coefficient of a pixel size to an actual size according to the pixel distance on the image and the actual distance between the monitored points; and B4, marking a possible displacement range of each monitored point from which the computer subsequently recognizes each point;

C, adjusting the secondary camera;

C1, extracting a first image frame photographed by the secondary camera, and selecting the reference points determined in step A3 as reference objects of a computer vision system for estimating a motion situation of the primary camera itself, where positions of the reference points in the first image frame are initial positions of the reference points;

C2, measuring a distance of a connection line between each reference point and the secondary camera;

C3, selecting two adjacent reference points in a same group, measuring a pixel distance on the image and an actual distance in the real world between the two reference points, such that the computer automatically calculates a proportion coefficient of a pixel size to an actual size on the distances according to the pixel distance on the image and the actual distance between the reference points; and C4, marking a possible displacement range of each reference point, from which the computer subsequently recognizes each point; and D, calculating and recording vibration data;

D1, synchronously collecting images frame by frame by the primary cameras and the secondary cameras; by tracking contour information of measured points, respectively comparing positions of the monitored points and reference points in a subsequent image frame with the initial positions thereof, and calculating a displacement value of each monitored point directly measured by the primary camera before motion compensation and a displacement value of each reference point obtained by the secondary camera which is observed due to a self-motion of the group of cameras;

D2, establishing a corresponding relationship between rotation and translation of a dual-camera system and the displacement of each reference point, and calculating the rotation and translation of the dual-camera system itself;

D3, according to displacement information of the dual-camera system obtained in D2 and a distance between the main camera and the monitored point, obtaining a compensation value of an error generated due to the motion of the primary camera, and obtaining a displacement of a bridge structure after the motion compensation by the displacement value of the monitored point directly measured by the primary camera in step D1 minus the compensation value generated by the motion of the primary camera; and D4, recording time and displacement data, and forming vibration monitoring data of each point position of the bridge structure.

Compared with the conventional methods, the method has the following several advantages:

1. Monitoring precision is high, and an error caused by camera displacement can be automatically calculated.

2. Non-contact monitoring method is provided for a wide adaptive range, and the monitoring accuracy is not affected by environmental factors such as temperature, humidity and acid-base properties.

3. The computer vision method is used to measure the structural vibration so as to reduce labor costs and device investments.

4. The devices involved has a long service life, and can be used for long-term vibration monitoring.

5. The devices are simple and convenient to be installed, and have no influence on the structure itself or the traffic condition.

6. A single camera can be used for multi-point distribution vibration monitoring for bridge structure.

7. Tracking displacement conditions of monitored points through contour features of the monitored points has a stronger robustness than directly tracking displacement conditions of the monitored points through the pixel values of the monitored points.

8. Contour texture of the bridge structure itself is used without additionally installing an observation target, which reduces system implementation difficulty.

BRIEF DESCRIPTION OF THE DRAWINGS

FIG. 2 is an implementation flowchart of the present disclosure.

REFERENCE NUMERALS

Figure 1:
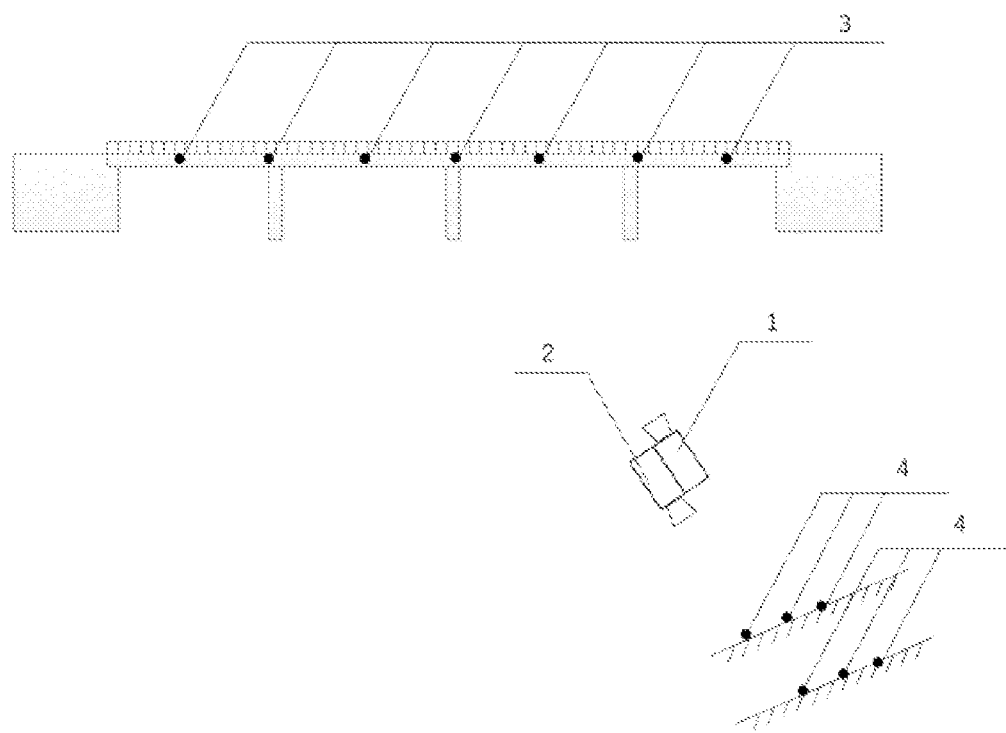
FIG. 1 is a schematic arrangement diagram of devices for implementing a method of the present disclosure.

1—primary camera;
2—secondary camera;
3—monitored point;
4—reference point.

DETAILED DESCRIPTION OF THE EMBODIMENTS

Specific implementations of the present disclosure are further elaborated below by combining the schematic arrangement diagram of devices shown in FIG. 1 and the implementation flowchart shown in FIG. 2. Specific steps thereof are as follows.

A structural vibration monitoring method based on computer vision and motion compensation includes:

A, installing cameras;

A1, selecting multiple monitored positions at key regions such as support points, a midspan, and anchor points for guying cables of a bridge to be monitored, and selecting positions with obvious contour features as monitored points 3;

A2, rigidly connecting a primary camera 1 and a secondary camera 2, and selecting an installation position, such that the primary camera aims at a bridge to be monitored, and the secondary camera aims at a place where no displacement is assumed to occur, such as a nearby wall body or ground;

A3, selecting, on the wall body or ground in a monitoring range of the secondary camera, a plurality of positions with obvious contour features at a certain distance as a group of reference points 4; and selecting another distance in a range of depth of field and further selecting a plurality of positions as another group of reference points, to obtain a plurality of reference points with clear images and different distances; and A4, debugging the primary camera and the secondary camera, to ensure that real-time monitoring images of the bridge can be obtained, and capturing a first image frame;

B, adjusting the primary camera;

B1, selecting, from the first image frame captured in step A4, monitored points determined in step A1 as tracking targets of computer vision, where positions of the monitored points in the first image frame are initial positions of the monitored points;

B2, measuring a distance of a connection line between each monitored point 3 and the primary camera 1;

B3, selecting two adjacent monitored points, and measuring a pixel distance on the image and an actual distance in a real world between the two monitored points, such that a computer automatically calculates a proportion coefficient of a pixel size to an actual size according to the pixel distance on the image and the actual distance between the monitored points; and B4, marking a possible displacement range of each monitored point, from which the computer subsequently recognizes each point;

C, adjusting the secondary camera;

C1, extracting a first image frame photographed by the secondary camera, and selecting the reference points determined in step A3 as reference objects of a computer vision system for estimating a motion situation of the primary camera itself, where positions of the reference points in the first image frame are initial positions of the reference points;

C2, measuring a distance of a connection line between each reference point 4 and the secondary camera 2;

C3, selecting two adjacent reference points in a same group, measuring a pixel distance on the image and an actual distance in a real world between the two reference points, such that the computer automatically calculates a proportion coefficient of a pixel size to an actual size on the distances according to the pixel distance on the image and the actual distance between the reference points; and C4, marking a possible displacement range of each reference point, from which the computer subsequently recognizes each point; and D, calculating and recording vibration data;

D1, synchronously collecting images frame by frame by the primary camera and the secondary camera; by tracking contour information of measured points, respectively comparing positions of the monitored points and reference points in a subsequent image frame with the initial positions thereof, and calculating a displacement value of each monitored point 3 directly measured by the primary camera before motion compensation and a displacement value of each reference point 4 obtained by the secondary camera which is observed due to a self-motion of the group of cameras;

D2, establishing a corresponding relationship between rotation and translation of a dual-camera system and the displacement of each reference point, and calculating the rotation and translation of the dual-camera system itself;

D3, according to displacement information of the dual-camera system obtained in D2 and a distance between the primary camera 1 and the monitored point 3, obtaining a compensation value of an error generated due to the motion of the primary camera, and obtaining a displacement of a bridge structure after the motion compensation by the displacement value of the monitored point directly measured by the primary camera in step D1 minus the compensation value generated by the motion of the primary camera; and D4, recording time and displacement data to form vibration monitoring data of each point position of the bridge structure.

The content described in the examples of the specification is merely an enumeration of the implementations of the inventive concept, and the claimed scope of the present disclosure should not be construed as being limited to the specific forms stated in the examples. Equivalent technical means that come into the minds of those of skills in the art in accordance with the inventive concept also fall within the claimed scope of the present disclosure.

What is claimed is:

1. A structural vibration monitoring system based on computer vision and motion compensation, comprising:

a computer; and two cameras including a primary camera and a secondary camera, wherein the primary camera is located such that the primary camera aims at a bridge to be monitored and the secondary camera is located such that the secondary camera aims at places including a nearby wall body or ground where no displacement is occurred;

wherein the secondary camera captures images of a plurality of positions, as a first group of reference points, on the wall body or ground in a monitoring range of the secondary camera; and captures images of a plurality of positions, as a second group of reference points, in a range of depth of field; and transmits the captured images of the first group of reference points and the captured images of the second group of reference points to the computer;

the computer, via the primary camera and the secondary camera, obtains real-time monitoring images of the bridge, nearby wall body or ground, and extracts a first image frame captured by the primary camera and a first image frame captured by the secondary camera;

the computer selects, in the first image frame captured by the primary camera, a plurality of monitored points located at support points, a midspan, and anchor points for guying cables of a bridge to be monitored as tracking targets of computer vision, wherein positions of the plurality of monitored points in the first image frame are initial positions of the plurality of monitored points;

the computer automatically calculates a proportion coefficient of a pixel size to an actual size according to a pixel distance on the image and an actual distance between two adjacent monitored points; and the computer subsequently recognizes each monitored point in a possible displacement range of each monitored point;

the computer selects, in the first image frame captured by the secondary camera, the first reference points and the second reference points as reference objects of a computer vision system, wherein positions of the first reference points and the second reference points in the first image frame are initial positions of the first reference points and the second reference points respectively;

the computer automatically calculates a proportion coefficient of a pixel size to an actual size on the distances according to a pixel distance on the image and an actual distance between two adjacent reference points; and the computer subsequently recognizes each reference point in a possible displacement range of each reference; and the computer, based on synchronously collected images frame by frame by the primary camera and the secondary camera, and by tracking contour information of measured points, respectively compares positions of the plurality of monitored points and the first reference points and the second reference points in a subsequent image frame with the initial positions thereof, and calculates a displacement value of each monitored point directly measured by the primary camera before motion compensation and a displacement value of each reference point obtained by the secondary camera which is observed due to a self-motion of the group of cameras;

the computer calculates, based on a corresponding relationship between rotation and translation of the primary camera and the secondary camera and the displacement of each reference point, the rotation and translation of the primary camera and the secondary camera themself;

the computer obtains, according to the rotation and translation of the primary camera and the secondary camera themself and a distance between the primary camera and the monitored point, a compensation value of an error generated due to the motion of the primary camera, and obtains a displacement of a bridge structure after the motion compensation by the displacement value of the monitoring point directly measured by the primary camera minus the compensation value generated by the motion of the primary camera; and the computer records time and displacement data to form vibration monitoring data of each monitored point of the bridge structure.

\* \* \* \* \*